Oct. 1, 1963   J. M. ZIABICKI   3,105,582
OIL PRESSURE ACTUATED CLUTCH
Filed March 13, 1961   3 Sheets-Sheet 2
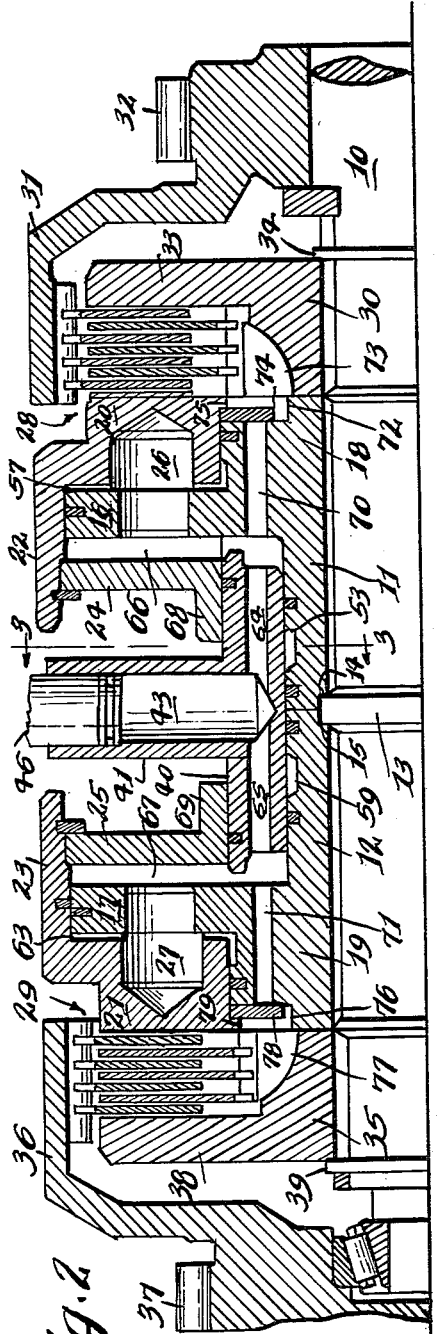
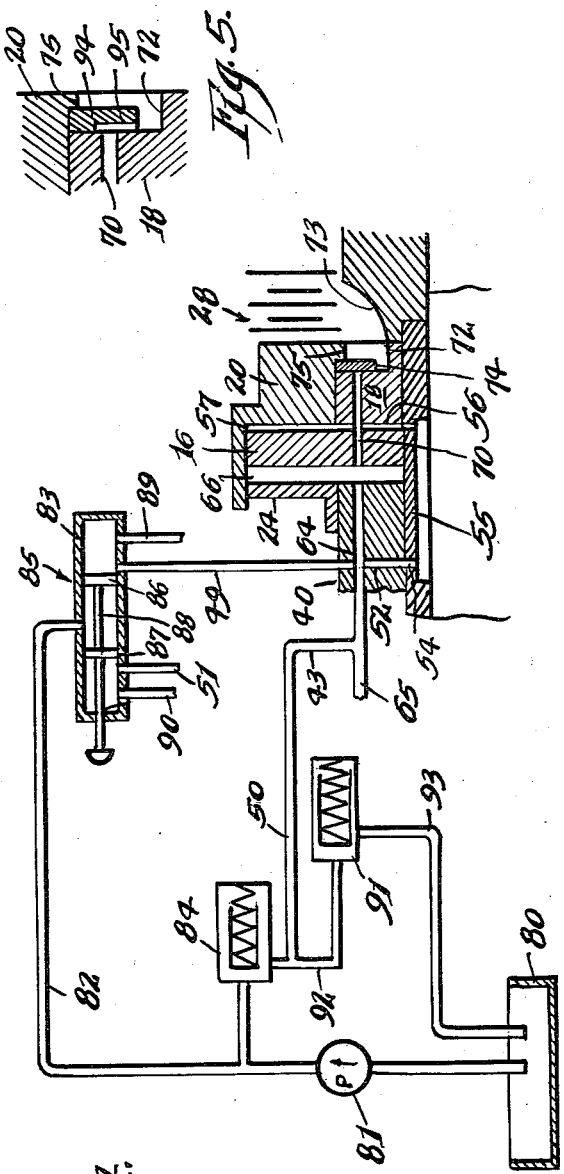
Inventor,
Joseph M. Ziabicki
By John W Darley
Attorney.

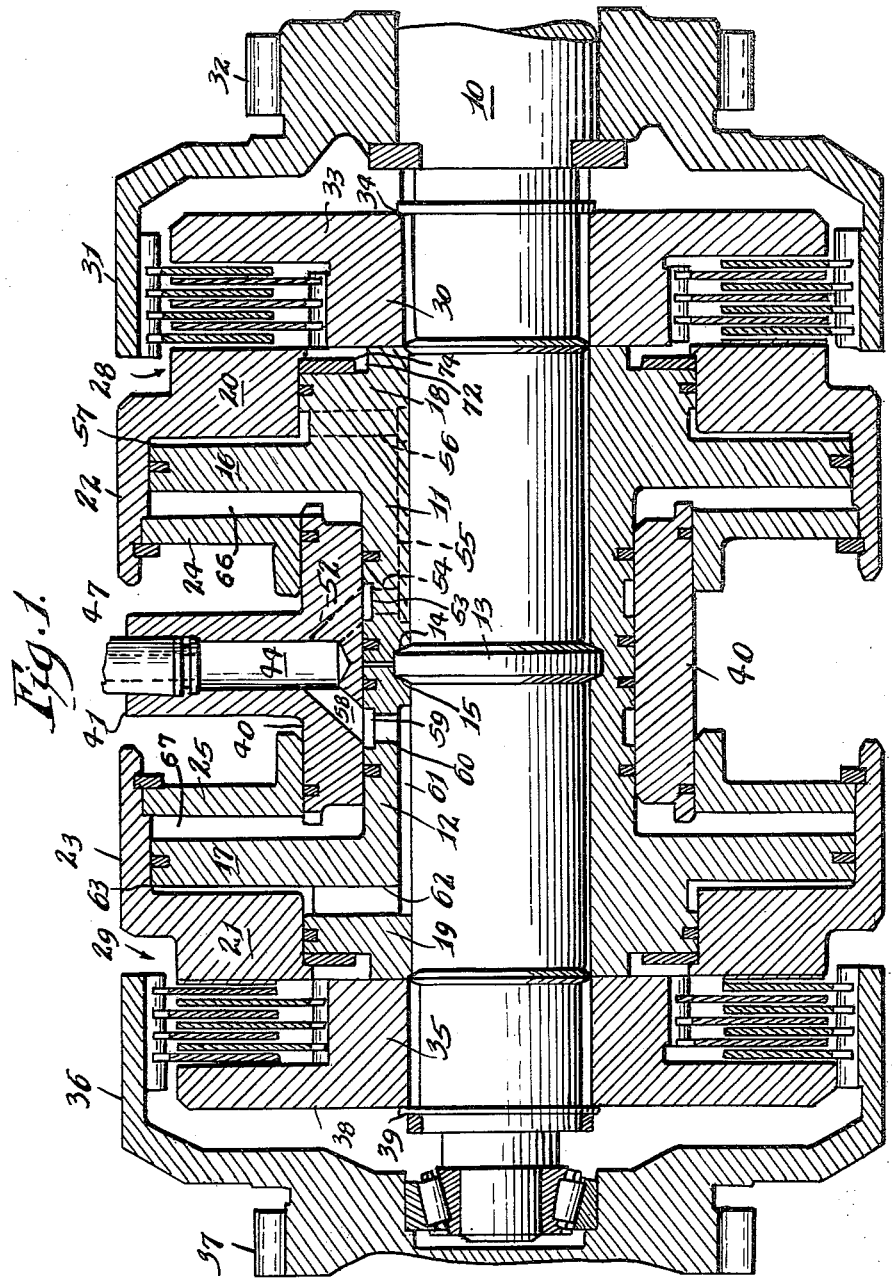

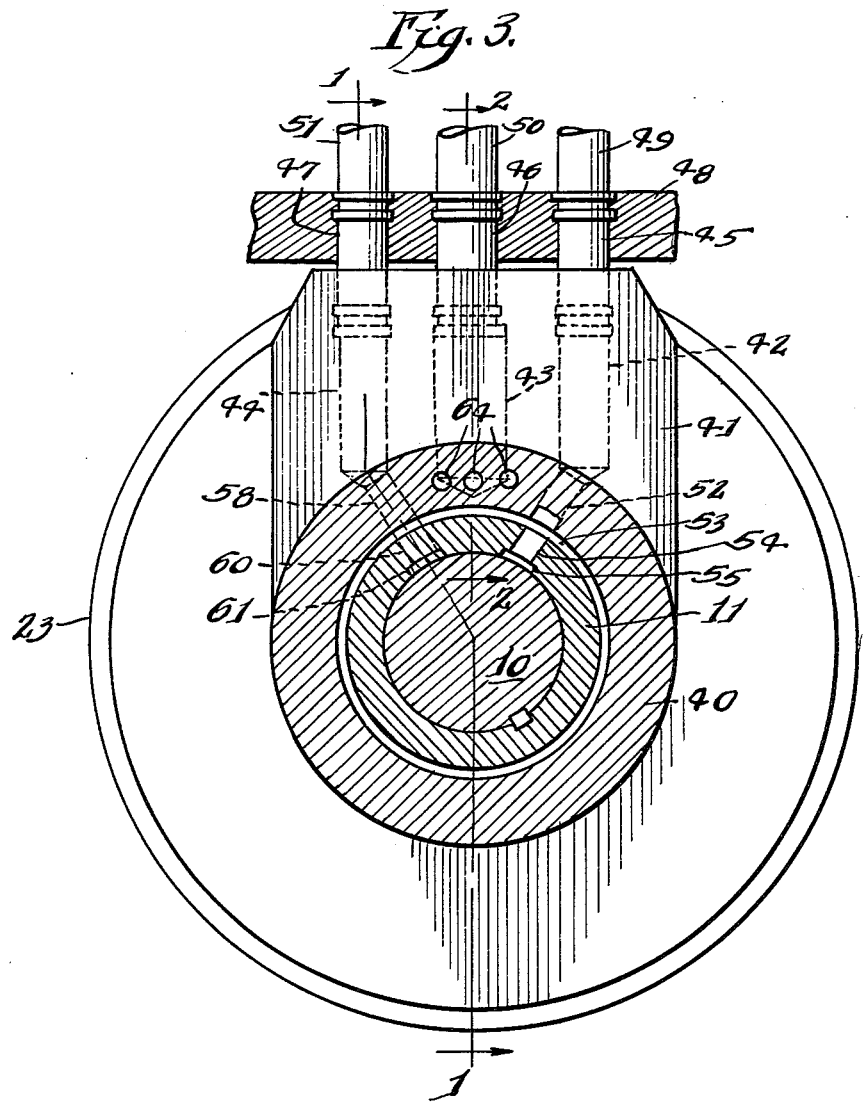

Patented Oct. 1, 1963

3,105,582
OIL PRESSURE ACTUATED CLUTCH
Joseph M. Ziabicki, Racine, Wis., assignor to Twin Disc Clutch Company, Racine, Wis., a corporation of Wisconsin
Filed Mar. 13, 1961, Ser. No. 95,077
8 Claims. (Cl. 192—113)

My invention relates to oil pressure actuated clutches of the friction type and more particularly to a control of the oil flow to secure release and engagement of the clutch in conjunction with a cooling oil flow to the clutch plates.

One object of the invention is to provide a clutch of the character indicated in which cooling flow to the clutch plates occurs only while the plates are being moved into and during full engagement.

A further object is the provision of a clutch as above in which control on the cooling oil flow is exercised by valve means whose position is determined by the engaging member of the clutch from release to engagement.

A further object is to provide a duplex, friction clutch in which each clutch is oil pressure actuated and is included in an oil pressure system conditioned for selective engagement of either clutch and a release of the other clutch in conjunction with the establishment of a cooling oil flow to the plates of the engaged clutch.

In the drawings:

FIG. 1 is a sectional elevation of a duplex clutch as taken along the line 1—1 in FIG. 3, both clutches being released.

FIG. 2 is a fragmentary section along the line 2—2 in FIG. 3.

FIG. 3 is a section along the line 3—3 in FIG. 2.

FIG. 4 is a schematic of the oil pressure system for controlling clutch operations, only one clutch being shown.

FIG. 5 is an enlarged, fragmentary section of a modified ring valve structure.

For purpose of description, the invention will be described in connection with a duplex clutch structure for effecting forward and reverse drives, or drives in the same direction at different speeds. However, one aspect of the invention, namely, the control of cooling oil flow to the clutch plates is susceptible of application to a single clutch only.

Referring to FIG. 1, the numeral 10 designates a shaft, which for purpose of illustration will be regarded as the input member although the direction of drive through the clutch structure may be reversed for obvious reasons. Keyed to the input shaft 10 in opposing and slightly spaced relation are sleeves 11 and 12 which are spaced by an annular shaft shoulder 13 which fits into complementary recesses 14 and 15, respectively, in the sleeves 11 and 12. These sleeves respectively include annular, flange-like reaction members 16 and 17 whose relative axial positions are maintained at all times.

The sleeves 11 and 12 also include annular shoulders 18 and 19 on which are slidable in sealed relation thereto annular engaging pistons 20 and 21, all respectively. Annular shells 22 and 23 have slidable and sealing relation to peripheries of the reaction members 16 and 17 and provide connectors between the engaging pistons 20 and 21 and annular release pistons 24 and 25, all respectively. From the foregoing, it will be understood that the pistons 20 and 24 have straddle relation to the reaction member 16, and the pistons 21 and 25 have like relation to the reaction member 17 and, further, that the pistons 20 and 24 and the shell 22, and the pistons 21 and 25 and the shell 23, respectively, constitute unitary structures. These structures are held against rotation relative to the reaction members 16 and 17 by one or more pins 26 and 27 mounted in the reaction member 16 and engaging piston 20, and the reaction member 17 and engaging piston 21, all respectively, only one pin being shown in each instance.

When the pistons 20 and 21 are moving in engaging directions as presently described, they respectively engage stacks of clutch plates 28 and 29. Alternate plates of the clutch stack 28 have splined engagement with a hub 30 which has like engagement with the shaft 10 while the intervening plates have splined engagement with an internally toothed, annular member 31 that is fast to a pinion 32 forming part of a subsequent gear train (not shown). When the plates of the clutch stack 28 are engaged, they are clamped against an abutment plate 33, preferably formed integral with the hub and the latter is held in abutting relation to the sleeve shoulder 18 by a lock ring 34 encircling the shaft 10.

Alternate plates of the clutch stack 29 have splined engagement with a hub 35 which has like engagement with the shaft 10 while the intervening plates have splined engagement with an internally toothed, annular member 36 that is fast to a pinion 37 forming part of a subsequent gear train (not shown). When the plates of the clutch stack 29 are engaged, they are clamped against an abutment plate 38, preferably formed integral with the hub 35, and the latter is held in abutting relation to the sleeve shoulder 19 by a lock ring 39 encircling the shaft 10.

Referring to FIGS. 1 and 3, a sleeve 40 encircles the opposed ends of the sleeves 11 and 12 in symmetrical and sealed relation thereto and projecting radially therefrom is a block manifold 41 that includes parallel passages 42, 43 and 44. The outer ends of these passages connect, respectively, with tubes 45, 46 and 47 that are mounted in a convenient fixed part 48 of the equipment with which the clutch is used and which serves to anchor the manifold 41 against rotation with the sleeves 11 and 12. The fixed part 48 is intended to generally represent any means for holding the manifold 41 stationary. The outer ends of the tubes 45, 46 and 47 connect, respectively, with hoses 49, 50 and 51 that are tied in with an oil pressure system as presently described.

The passages 42 and 44 convey relatively high, oil pressure for engaging the clutches 28 and 29, while the passage 43 conveys relatively low, oil pressure for constantly biasing the same clutches to release positions, suggested pressures being 100 p.s.i. and 20 p.s.i., only the relative order of magnitude being important.

The inner end of the passage 42 connects successively through a passage 52 in the manifold sleeve 40, an annular channel 53 and a radial passage 54 in the sleeve 11, a longitudinal passage 55 included between the shaft 10 and a recessed part of the sleeve 11, and a radial passage 56 in the sleeve shoulder 18 with an annular, clutch engaging cylinder 57 included between the shoulder 18, engaging piston 20, shell 22 and reaction member 16.

The inner end of the passage 44 connects successively through a passage 58 in the manifold sleeve 40, an annular channel 59 and a radial passage 60 in the sleeve 12, a longitudinal passage 61 included between the shaft 10 and a recessed part of the sleeve 12, and a radial passage 62 in the sleeve shoulder 19 with an annular, clutch engaging cylinder 63 included between the shoulder 19, engaging piston 21, shell 23 and reaction member 17.

Referring to FIGS. 2 and 3, the inner end of the passage 43 connects with oppositely extending passages 64 and 65 provided in the manifold sleeve 40 and which communicate with annular release cylinders 66 and 67 included between the release piston 24, shell 22, reaction member 16, and sleeves 11 and 40, and between the release piston 25, shell 23, reaction member 17, and sleeves 12 and 40, all respectively. The inner portions of the release pistons 24 and 25 are annularly flanged at 68 and 69, respectively, for sealing and relative sliding contact with the sleeve 40.

A passage 70, communicating at its inlet end with the release cylinder 66, extends longitudinally through the reaction member 16 and shoulder 18, and a similar passage 71, communicating at its inlet end with the release cylinder 67, extends longitudinally through the reaction member 17 and shoulder 19. The number of the passages 70 and 71, respectively, may be varied. It is an important feature of the invention to control flow through the passages 70 and 71 under stated conditions of operation.

Considering flow through the passage 70, the shoulder 18 includes, in the end adjacent the clutch stack 28, an annular recess 72 which communicates with a plurality of slots 73 of the arcuate type, only one being shown, provided in the hub 30 and these slots additionally communicate with the inner edges of the plates in the clutch stack 28. Carried by the piston 20 and operable in the recess 72 is a ring valve 74 which, in the release position of the engaging piston 20 shown in FIG. 2, is held in substantially closing relation to the adjacent or outlet end of the passage 70 by an annular shoulder 75 extending inwardly from the piston 20.

For flow control through the passage 71, a communicating, annular recess 76 and one or more arcuate slots 77, similar to the recess 72 and slot 73, are respectively provided in the opposed ends of the shoulder 19 and hub 35, the slots 77 communicating with the inner edges of the plates in the clutch stack 29. Carried by the piston 21 and operable in the recess 76 is a ring valve 78, which in the release condition of the clutch stack 29 shown in FIG. 2 is held in substantially closing relation to the adjacent or outlet end of the passage 71 by an annular shoulder 79 extending inwardly from the piston 21.

The foregoing structure is included in an oil pressure system which is schematically shown in FIG. 4 as specifically applied to the clutch stack 28 and with fragmentary leads to the cylinders of the other clutch stack 29.

The oil is withdrawn from a convenient sump 80 by a suitably driven pump 81 and is delivered through a pipe 82 to a casing 83 at a pressure determined by a conventional pressure regulating valve 84, assumed in the present instance to be 100 p.s.i. The casing 83 forms part of a typical control valve 85 and manually reciprocable in the casing 83 are pistons 86 and 87 which are connected by a stem 88, the delivery end of the pipe 82 connecting, in the control valve position shown, with the casing 83 midway of the pistons 86 and 87 which corresponds to the release positions of the clutch stacks 28 and 29 shown in FIGS. 1 and 2.

To the right of the piston 86 in the position shown, the casing 83 connects through a pipe 89 with the sump 80 and successively through the hose 49 (see FIG. 3) and passages 52, 54, 55 and 56 with the engaging cylinder 57. To the left of the piston 87 in the position shown, the casing 83 connects through a pipe 90 with the sump 80 and through the hose 51 (see FIG. 3) and connected passages (see FIG. 1) with the engaging cylinder 63.

From the foregoing, it will be apparent that, with the control valve 85 conditioned as shown in FIG. 4, high or engaging oil pressure is denied to the engaging cylinders 57 and 63 which are at the same time in communication with the sump 80.

A conventional pressure regulating valve 91 has its inlet connected by a pipe 92 to the outlet of the regulating valve 84 and its outlet connected by a pipe 93 to the sump 80, the two valves therefore being in series flow relation and the valve 91 establishing in the hose 50 (see FIG. 3) whose inlet connects with the pipe 92 the assumed pressure of 20 p.s.i. The hose 50 connects through the passages 43 and 64 with the release cylinder 66 and also with the passage 70 whose outlet in FIG. 4 is closed by the ring valve 74. The hose 50 also connects through passages 43 and 65 (see FIG. 2) with the release cylinder 67 and also with the passage 71 whose outlet in FIG. 2 is closed by the ring valve 78.

As will be noted from FIG. 4, the regulation provided by the valve 91 is constant and unaffected by the control valve 85. Accordingly, a constant release pressure is maintained in the release cylinders 66 and 67 regardless of whether the associated clutches are engaged or not.

With the parts in the several positions shown in the drawings, the clutch stacks 28 and 29 stand released due to the biasing release pressure in the release cylinders 66 and 67. At this time, the ring valves 74 and 78 are held by the engaging pistons 20 and 21 in substantially closing relation to the outlet ends of the passages 70 and 71, all respectively. By "substantially closing relation" is meant that, considering the normal fit of such parts in a clutch structure, there will be a small amount of leakage past the ring valves 74 and 78 that will be sufficient for minimum lubrication of the plates of the clutch stacks 28 and 29 when released.

In any situation where the ring valves 74 and 78 fit too tight to assure such leakage, the modification shown in FIG. 5 may be employed wherein a ring valve 94 is provided with one or more throttling grooves 95 to establish the required lubrication.

Either of the two leakage conditionings of the ring valves obviates the circulation of a large quantity of oil through the clutch plates when released which would increase clutch drag and cause excessive floating of the plates.

If it is desired to engage the clutch stack 28, the control valve 85 is shifted to the right as viewed in FIG. 4 to place the piston 86 between the connections of the hose 49 and pipe 89 to the casing 83. The engaging cylinder 57 is thus disconnected from the sump 80 and connected to the relatively high pressure source. The engaging piston 20 begins moving toward the right and coincident with the beginning of such movement, the ring valve 74 is freed for movement in the same axial direction under the impulse of oil pressure in the passage 70. This passage is therefore fully opened to discharge a cooling oil flow over the plates of the clutch stack 28 during their approach to engagement and while fully engaged, it being understood that the width of the ring valve 74 is less than that of the recess 72. During this action, the clutch stack 29 and its associated parts remain as shown in the drawings, the ring valve 78 being closed.

To restore the clutch stack 28 to release position, the control valve 85 is conditioned as shown in FIG. 4. The constant biasing pressure in the release cylinder 66 assumes control and shifts the engaging piston 20 to the release position shown and this piston shifts the ring valve 74 to its substantially closing position in relation to the passage 70.

Engagement and release of the clutch stack 29 are effected in like manner by the described associated parts and the operation of the ring valve 78 is identical with the ring valve 74 under like circumstances.

It will be apparent that only plates of that clutch stack which is engaged are oil cooled, that only a minimum oil supply is provided for lubrication of the plates of the released clutch stack, and that these results are secured under positive control without the necessity for any springs.

I claim:

1. A clutch comprising a plurality of annular friction plates, piston means movable between positions releasing and engaging the plates, a passage for conducting cooling oil under pressure to the inner edges of the friction plates, a valve for controlling flow through the passage and adapted for movement in an opening direction relative to that of the piston means in engaging direction, and means operable by the piston means when in plate release position for substantially closing the valve and for freeing the valve for opening by the cooling oil pressure when the piston means is moved to engage the plates.

2. A clutch as defined in claim 1 wherein the valve is carried internally by the piston means which includes a shoulder engageable with and holding the valve in substantially closed position.

3. A clutch comprising a plurality of annular friction plates, selectively operable means oil pressure actuated at a relatively high pressure for engaging the plates, other means connected to the selectively operable means and oil pressure biased at a constant relatively low oil pressure in a direction to move the selectively operable means to plate release position when the high oil pressure is interrupted, a passage for conducting the low pressure oil to the inner edges of the plates, a valve for controlling flow through the passage and adapted for movement in an opening direction relative to that of the selectively operable means in engaging direction, and means activated by the selectively operable means when in plate release position for substantially closing the valve and for freeing the valve for opening by the low pressure oil when the selectively operable means is moved to plate engaging position.

4. A clutch as defined in claim 3 wherein the valve is carried internally by the selectively operable means which includes a shoulder engageable with and holding the valve in substantially closed position.

5. An oil pressure actuated clutch comprising a plurality of annular friction plates, a cylindrical shell having radial end walls coaxial with the friction plates, an annular reaction member held against axial movement within the shell and defining therewith annular engaging and release cylinders, means for selectively supplying oil at relatively high pressure to the engaging cylinder for actuating one of the end walls to engage the plates, means for continuously supplying oil at relatively low pressure to the release cylinder for actuating the other end wall in a direction enabling the release of the plates when the high pressure oil is interrupted, a passage providing a connection between the low pressure oil supply and the inner edges of the plates, a ring valve for controlling oil flow through the passage and adapted for movement in an opening direction relative to that of said one end wall in engaging direction, and means operable by said one end wall when in plate release position for substantially closing the valve and for freeing the valve for opening by the low pressure oil when said one end wall is moved to engage the plates.

6. An oil pressure actuated clutch as defined in claim 5 wherein the valve is annular and carried internally of said one end wall which includes an annular shoulder engageable with and holding the ring valve in the substantially closed position.

7. In clutch construction, the combination of a shaft, a pair of multiple plate clutches mounted on the shaft, each clutch including annular plate engaging and release cylinders and a plate engaging piston, and an oil pressure system including the cylinders of each clutch, means for constantly supplying oil at relatively low pressure to the release cylinders of both clutches, a control valve, means for supplying oil at relatively high pressure to the control valve which is shiftable between a position interrupting the high pressure supply to determine a simultaneous release of both clutches and a position connecting the high pressure supply to the engaging cylinder of one clutch to engage the same coincident with the release of the other clutch, separate passages connecting the low pressure oil supply with the inner edges of the clutch plates, respectively, separate valve means for controlling flow through the passages, respectively, each valve means being adapted for movement in an opening direction relative to that of the associated piston in engaging direction, and means operable by the engaging piston of each clutch when in release position for substantially closing the associated valve means and for freeing the associated valve means for opening by the low pressure oil when the last named piston is moved to engaging position.

8. A clutch combination as defined in claim 7 wherein each valve means is carried internally by the associated piston which includes a shoulder engageable with and holding the valve means in the substantially closing position.

References Cited in the file of this patent
UNITED STATES PATENTS

| | | |
|---|---|---|
| 2,868,341 | Snoy | Jan. 13, 1959 |
| 2,930,257 | Christenson | Mar. 29, 1960 |
| 2,953,941 | Schwartz et al. | Sept. 27, 1960 |

FOREIGN PATENTS

| | | |
|---|---|---|
| 862,237 | Germany | Jan. 8, 1953 |